United States Patent
Zhou (10) Patent No.: US 10,681,606 B2
(45) Date of Patent: Jun. 9, 2020

(54) FAST MOVING SCENARIO ACCESS POINT SWITCHING

(71) Applicant: Intel Corporation, Santa Clara, CA (US)

(72) Inventor: Yu Zhou, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/062,047

(22) PCT Filed: Dec. 17, 2015

(86) PCT No.: PCT/CN2015/097710
§ 371 (c)(1),
(2) Date: Jun. 13, 2018

(87) PCT Pub. No.: WO2017/101070
PCT Pub. Date: Jun. 22, 2017

(65) Prior Publication Data
US 2018/0376399 A1    Dec. 27, 2018

(51) Int. Cl.
*H04W 36/36*    (2009.01)
*H04W 12/06*    (2009.01)
(Continued)

(52) U.S. Cl.
CPC .......... *H04W 36/36* (2013.01); *H04W 12/06* (2013.01); *H04W 24/08* (2013.01);
(Continued)

(58) Field of Classification Search
CPC ..... H04W 84/12; H04W 48/20; H04W 12/06; H04W 36/32; H04W 36/0083; H04W 36/18; H04W 4/48; Y02D 70/142
See application file for complete search history.

(56) References Cited

U.S. PATENT DOCUMENTS 6,332,077 B1 * 12/2001 Wu ..................... H04W 8/08
370/331
2004/0208151 A1 * 10/2004 Haverinen .......... H04L 29/12
370/338
(Continued)

FOREIGN PATENT DOCUMENTS

CN    101483894 A    7/2009
CN    101808309 A    8/2010
(Continued)

OTHER PUBLICATIONS

"International Application Serial No. PCT/CN2015/097710, International Search Report dated Aug. 26, 2016", 4 pgs.
(Continued)

*Primary Examiner* — Marsha D Banks Harold
*Assistant Examiner* — Elton Williams
(74) *Attorney, Agent, or Firm* — Schwegman Lundberg & Woessner, P.A.

(57) ABSTRACT

Embodiments of a system and method for switching access points in a fast moving scenario in a wireless network are generally described herein. In some embodiments, an apparatus of a communication station (STA) includes transceiver circuitry to: send a request to a first access point (AP) to associate with the first AP to access a network, and receive a service set identifier (SSID), a channel number, an ordered listing of APs for association when traveling in a fast moving scenario, and a plurality of basic service set identifications (BSSIDs) corresponding to the ordered listing of APs. The apparatus includes processing circuitry to determine whether a signal strength of a second AP exceeds a signal strength of the first AP in the fast moving scenario fast moving scenario access point switching.

25 Claims, 6 Drawing Sheets

(51) Int. Cl.
*H04W 36/00* (2009.01)
*H04W 36/32* (2009.01)
*H04W 24/08* (2009.01)
*H04W 84/12* (2009.01)
*H04W 36/30* (2009.01)

(52) U.S. Cl.
CPC ....... *H04W 36/0061* (2013.01); *H04W 36/32* (2013.01); *H04W 36/30* (2013.01); *H04W 84/12* (2013.01)

(56) References Cited

U.S. PATENT DOCUMENTS

| | | | | |
|---|---|---|---|---|
| 2005/0259619 | A1* | 11/2005 | Boettle | H04W 36/32 370/331 |
| 2015/0098358 | A1* | 4/2015 | Park | H04W 48/16 370/254 |
| 2015/0264614 | A1* | 9/2015 | Stager | H04W 36/0061 370/332 |

FOREIGN PATENT DOCUMENTS

| | | |
|---|---|---|
| CN | 103634860 A | 3/2014 |
| CN | 104469775 A | 3/2015 |
| EP | 2498549 A1 | 9/2012 |
| WO | WO-2007138056 A1 | 12/2007 |
| WO | WO-2017101070 A1 | 6/2017 |

OTHER PUBLICATIONS

"International Application Serial No. PCT/CN2015/097710, Written Opinion dated Aug. 26, 2016", 4 pgs.

* cited by examiner

| Times/Throughput | New (mbps) | Legacy (mbps) |
|---|---|---|
| 1 | 6.552 | 0.603 |
| 2 | 6.180 | 0.582 |
| 3 | 6.264 | 0.624 |
| 4 | 5.904 | 0.756 |
| 5 | 5.208 | 0.459 |
| 6 | 5.748 | 0.588 |
| Average | 5.976 | 0.602 |

FAST MOVING SCENARIO ACCESS POINT SWITCHING

CLAIM OF PRIORITY

This patent application is a U.S. National Stage Application under 35 U.S.C. 371 from International Application No. PCT/CN2015/097710, filed Dec. 17, 2015, published as WO 2017/101070, which is incorporated herein by reference.

TECHNICAL FIELD

Embodiments pertain to wireless communications. Some embodiments relate to associating a station to a wireless access point.

BACKGROUND

There are often may wireless access points (APs) that are accessible in a city. A user accesses the internet through one of these wireless hotspots. One issue with communicating data over a wireless network is that switching from one AP to another AP takes time and causes interruptions in service.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Wireless hotspots are prevalent in many cities. Users may access a network, such as the internet through these wireless hotspots. An example wireless hotspot is a WiFi hotspot, which may be used to access a Wireless Wide Area Network (WWAN) infrastructure. For example, a WiFi hotspot, access point (AP), or communication station (STA) may conform to a Institute of Electrical and Electronics Engineers (IEEE) 802.11 family of standards. WiFi best supports connections with a communication Station (STA) in a static or slow moving scenario (i.e., when the STA is moving slowly). If the STA is roaming in a fast moving scenario (i.e., when the STA is moving quickly), accessing and switching access points (APs) may be difficult, and throughput may drop sharply. In some examples in a fast moving scenario, a STA may not be able to send or receive data successfully due to the long re-association latency during AP switching. In fast moving scenarios, WiFi roaming and frequent AP switching may cause poor user experience. The complicated and long time pendency of AP switching is inefficient.

In legacy systems, when a STA attempts to switch to a new AP in a fast moving scenario, the STA takes a long time to switch to a new AP and once associated, may have already moved out of range of the new AP. In another example, the STA may switch to the new AP in time and remain in range, but may already be leaving the range of the new AP and be in better range of another AP. The legacy roaming and re-association systems are not suitable for a fast moving scenario. A new roaming system may simplify re-association flow to adapt to fast movement and make the WWAN network seamless for the user experience of a STA.

In a fast moving scenario, such as a WiFi STA of a user riding on a bus in a city or on an express highway. In an example, there are two common features of a fast moving scenario: a vehicle moving quickly along a fixed route and an initial station, (e.g., a stop before a route, a bus station, a charging window of an express highway, a train stop, etc.). These two features may be combined with a new re-association technique to adapt the fast moving scenario for WiFi STA. WiFi APs may be deployed along a route (e.g., bus route or train route), a service set identifier (SSID) and a channel number may be assigned for the APs, and basic service set identifier (BSSIDs) for the deployed APs may be determined.

When a vehicle stops in a station or charging window for the first time, the stop time is enough for the WiFi STA to associate the network, and the AP at the station or charging window may transfer relevant information (e.g., the BSSID, position, channel number, etc.) of the next APs in order to the newly associated STA. When the vehicle runs to a middle position between a first AP and a second AP, the STA may take advantage of the known next AP information and associate with the next AP actively. In an example, the STA does not need to detect the second AP through Probe_Req or Probe_Resp packets. In another example, the authentication procedure may be optimized at the first AP to join a network, without using Auth_Req or Auth_Resp during AP switching. These examples result in time saved during AP switching in the fast moving scenario.

The legacy roaming and re-association system uses three steps for a handshake. In an example, the new design uses only the third one (i.e., Asso_Req and Asso_Resp). This may improve efficiency of re-association when a STA is in a fast moving scenario and improve AP switching. Of the three steps for a handshake for AP switching, the first step, probe, uses the most time. Approximately hundreds of milliseconds (e.g., where a STA probes an AP actively) or thousands of milliseconds (e.g., where a STA listens for a beacon in each channel passively) may be consumed. Both of these scenarios require a long time relatively in wireless communication, which causes unreliability and failures in the fast moving scenario. Statistical averages include consuming 300~500 ms in the probe stage, or approximately rounded down to 300 millisecond, 1 ms for the authentication stage, and 1 ms for the association stage. The comparison ratio between the new and legacy techniques is: 1 ms/302 ms=0.33%. The new technique exhibits more efficiency than current solution by a large ratio.

Figure 1:
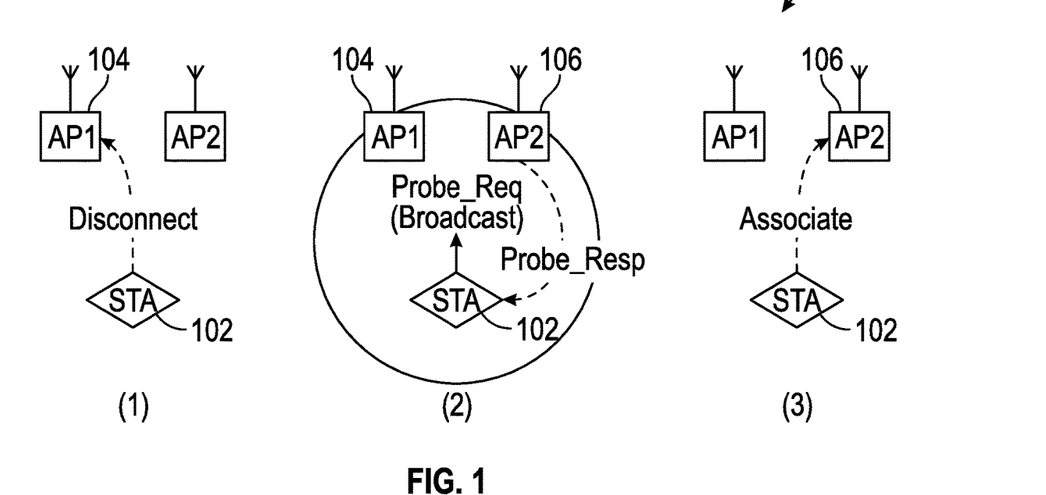
FIG. 1 is a functional diagrams illustrating access point (AP) switching in accordance with some embodiments.

FIG. 1 is a functional diagram 100 illustrating access point (AP) switching in accordance with some embodiments. FIG. 1 shows a legacy process for a STA 102 to switch between a first AP 104 and a second AP 106. In the first view, the STA 102 must disconnect from the first AP 104, before sending a probe request in the second view. The second view shows a probe response from the second AP 106 sent to the STA 102, which then may associate with the second AP 106, as shown in the third view. The new technique may eliminate the disconnection, probe request, and probe response shown in the first two views and may instead jump straight to the third view and associate with the second AP 106.

Figure 2:
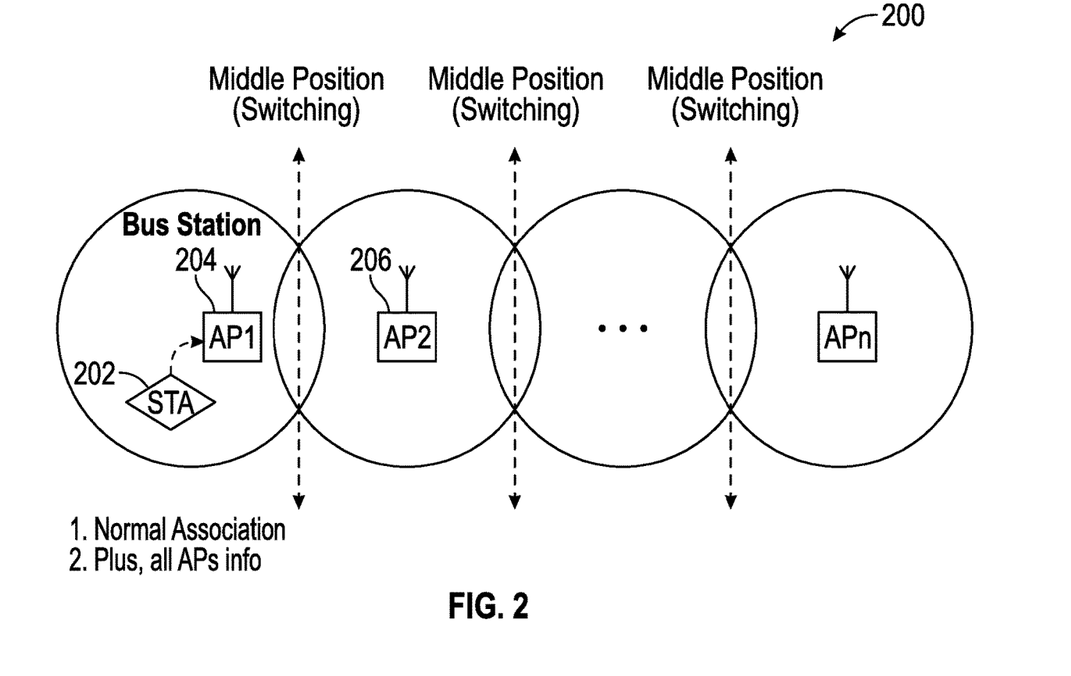
FIG. 2 is a functional diagram illustrating an initial configuration for fast-moving AP switching in accordance with some embodiments.

FIG. 2 is a functional diagram 200 illustrating an initial configuration for fast-moving AP switching in accordance with some embodiments. In an example, multiple APs may be deployed along a fixed route, such as a first AP 204, a second AP 206, etc. The basic info of these APs, such as a BSSID, a channel number, and a position may be known and saved, such as at a server. The STA 202 may receive information about the APs from the first AP 204, such as at a bus station. The STA 202 may associate with a network when a bus carrying the STA 202 stops at a station. The initial information may be sent to the STA 202 from a server and saved in memory of the STA 202 in sequence. In an example, AP coverage area may slightly overlap between neighbor APs, as shown in diagram 200 with the range of the first AP 204 and the range of the second AP 206 overlapping at a middle position.

Figure 3:
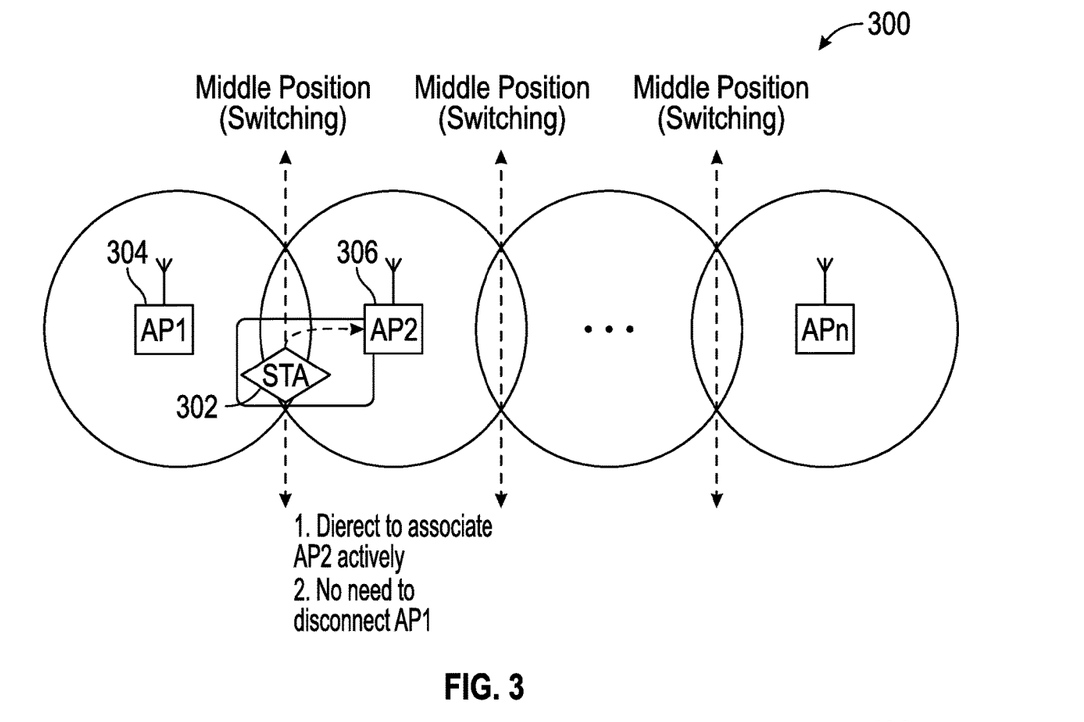
FIG. 3 is a functional diagram illustrating a switching configuration for fast-moving AP switching in accordance with some embodiments.

FIG. 3 is a functional diagram 300 illustrating a switching configuration for fast-moving AP switching in accordance with some embodiments. FIG. 3 shows the STA 302 in a middle position between a first AP 304 and a second AP 306. The STA 302 may switch from the first AP 304 to the second AP 306 at the middle position.

When a vehicle runs along the fixed route toward the second AP 306, the STA 302 may trigger an association with the second AP 306 actively after the STA 302 arrives at the middle position. The middle position may include a GPS determined middle position or the middle position may include a position where the STA 302 receives an equal received signal strength indicator (RSSI) between the first AP 304 and the second AP 306, or where the RSSI from the second AP 306 exceeds the RSSI from the first AP 304. From this position and moving forward along the fixed route, the signal from the second AP 306 will become stronger and the signal from the first AP 304 will become weaker. The STA 302 may switch APs at the middle position.

In another example, the STA 302 may receive a real time position through global positioning system (GPS) circuitry of the STA 302 and trigger the AP switching process when the STA 302 arrives at the middle position. The location of the middle position may be predetermined and stored at the STA 302. The middle position may be predetermined along the route before the STA 302 starts along the route, and the predetermined middle position may be sent by the first AP 304 to the STA 302.

In an example, the STA 302 does not wait to disconnect from the first AP 304 before associating with the second AP 306. By not waiting, the switch may be more efficient and may remove latency. By removing the probe and authentication aspects of the handshake time to associate with a new AP is greatly reduced.

In an example, the STA 302 may not be able to connect to the second AP 306 and may not be able to receive RSSI information from the second AP 306. The STA 302 may use a different channel than the first AP 304 to connect to the second AP 306. In this example, the STA 302 may utilize GPS to switch to the second AP 306 when the STA 302 is in the middle position. The STA 302 may determine when to connect to a third AP using RSSI. The STA 302 may connect to the third AP using a second channel that was used to connect to the second AP 306. The APs along the route of the STA 302 may have corresponding channels provided to the STA 302 at the first AP 304.

Figure 4:
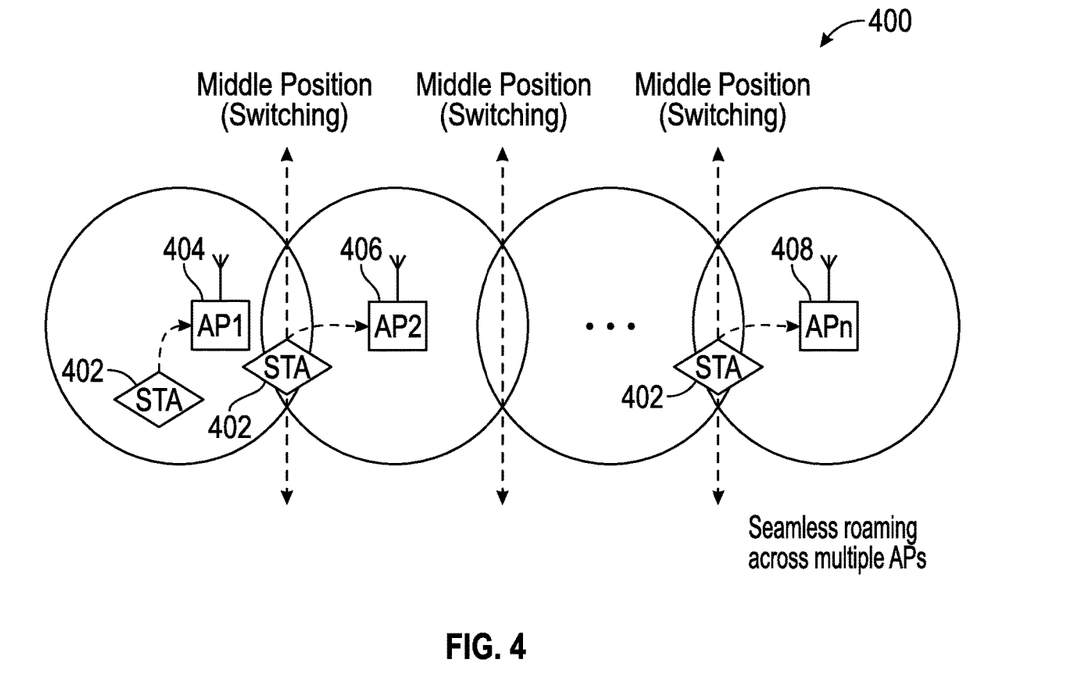
FIG. 4 is a functional diagram illustrating multiple configurations for fast-moving AP switching in accordance with some embodiments.

FIG. 4 is a functional diagram 400 illustrating multiple configurations for fast-moving AP switching in accordance with some embodiments. FIG. 4 shows a STA 402 in multiple configurations at different positions along a route, such as a route of a public transportation vehicle. The STA 402 in the first position receives configuration information from a first AP 404. The STA 402 switches at a first middle position to a second AP 406. At a later middle position, the STA 402 may switch to an nth AP 408.

In an example, the technique described herein includes a change to open systems interconnection (OSI) layer 2 switching (e.g., MAC layer or data link layer) of an AP or STA. An AP connects to a higher layer router using the MAC layer. In systems with multilayer switching (MLS), the MAC layer switching uses less time than layer 3 (e.g., IP layer or network layer) switching.

The benefits of switching APs in the fast moving scenario is amplified by switching at layer 2 over layer 3.

Figure 5:
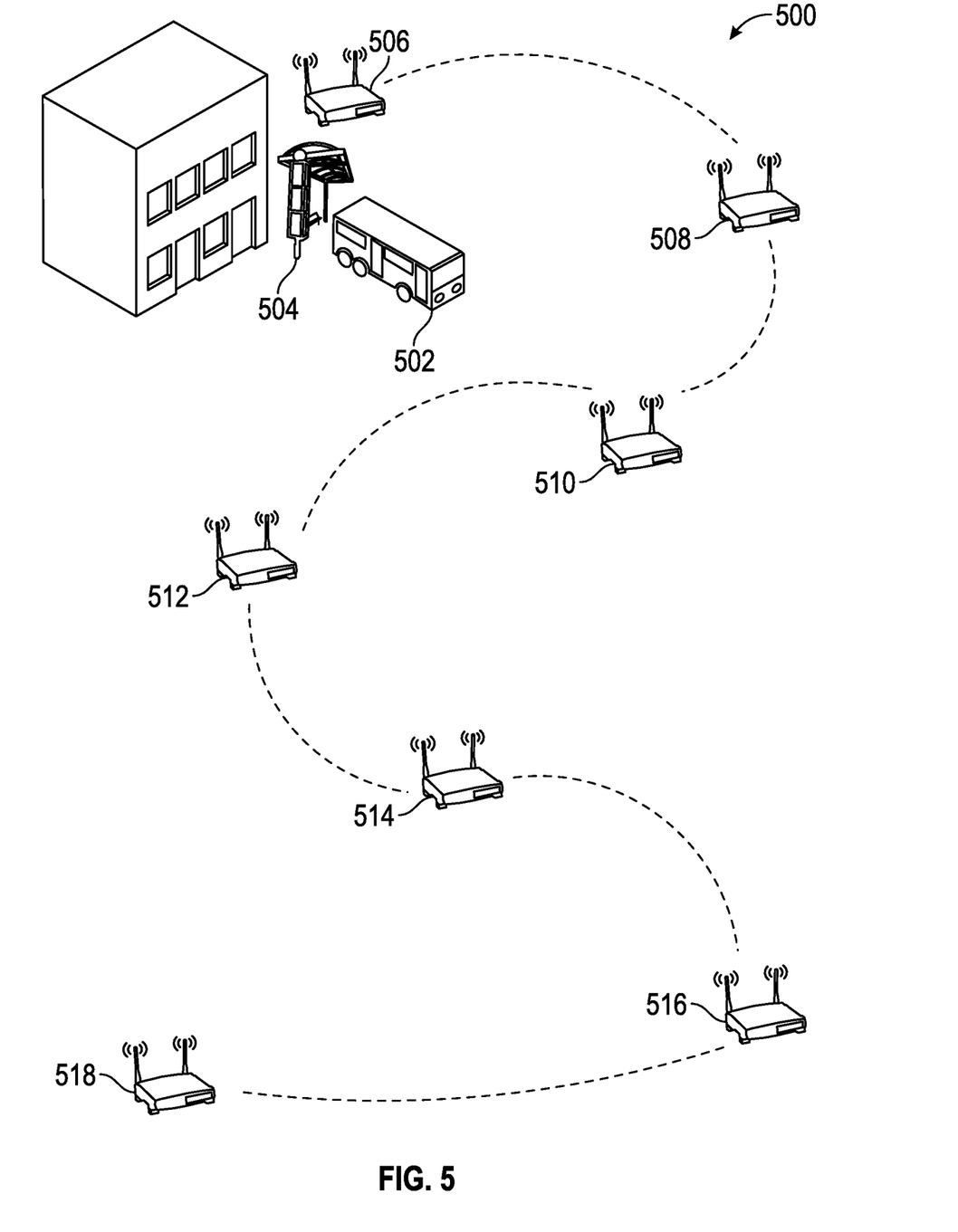
FIG. 5 illustrates a bus route with APs along the route in accordance with some embodiments.

FIG. 5 illustrates a bus route 500 with APs (e.g., 506-518) along the route in accordance with some embodiments. FIG. 5 includes a bus 502, a bus station 504, and a first AP 506. A user on the bus 502 may request WiFi access along the bus route on a STA. The first AP 506 may receive the request from the STA. In response, the first AP 506 may determine a path the bus 502 will take including an ordered listing of APs from AP 508 to AP 518. The first AP 506 may assign a service set identifier (SSID) and a channel number of the APs 508-518 in the ordered listing. The first AP 506 may identify a plurality of basic service set identifications (BSSIDs) corresponding to the APs 508-518 in the ordered listing. The first AP 506 may transmit an association response to the STA indicating successful association and transmit the ordered listing of APs 508-518, as well as the SSID, the channel number, and the plurality of BSSIDs corresponding to the APs 508-518.

After the STA receives this information from the AP 506, the STA on the bus 502 may use the SSID and the channel number and use the plurality of BSSIDs, each corresponding to one of APs 508-518 to connect to each of the APs 506-518. In an example, the SSID and the channel number are the same for each AP in the ordered listing 508-518. In another example, the AP 506 also shares the SSID and channel number. The STA is located on the bus 502, and moves with the bus 502 in a fast moving scenario. As the bus 502 leaves the station 504, the STA moves along the path determined by the first AP 506. The STA reaches a point along the path between the first AP 506 and a second AP 508 where the signal strength of the second AP 508 exceeds the signal strength of the first AP 506. When that point is reached, the STA may switch from using the first AP 506 to using the second AP 508, without changing the SSID or channel number. In an example, the STA may switch without sending a probe request, receiving a probe response, sending an authentication request, or receiving an authentication response from the second AP 508.

Figure 6A:
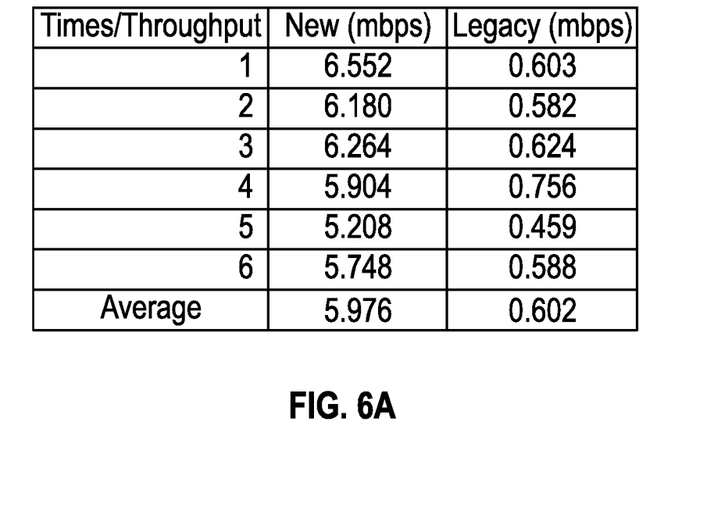
FIG. 6A-B illustrate representations of example test results in a fast moving scenario.
Figure 6B:
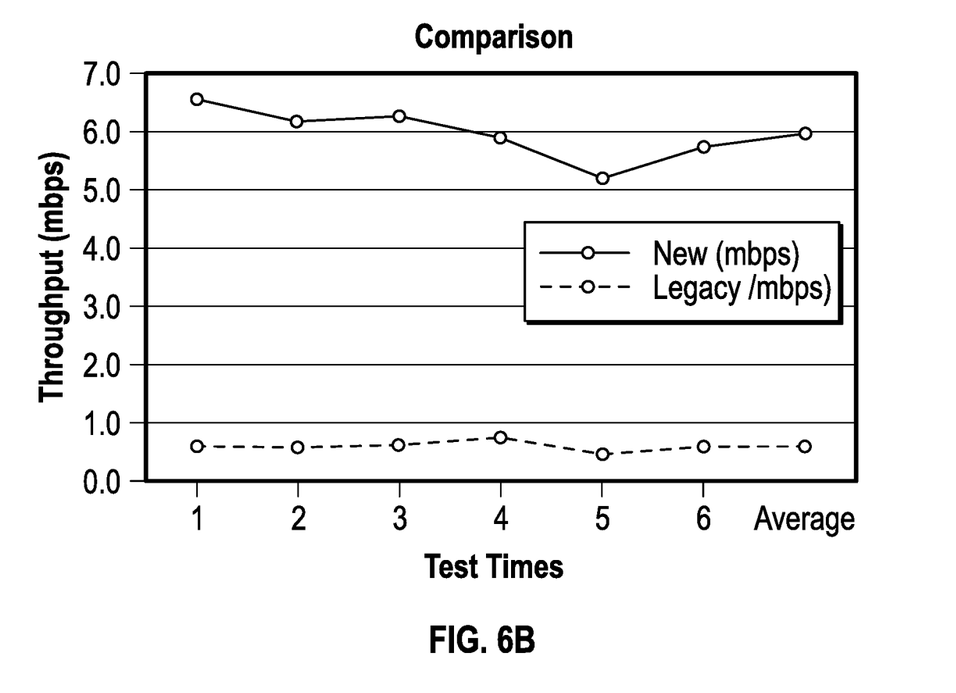

FIG. 6A-B illustrate representations of example test results in a fast moving scenario. FIG. 6A shows a table of test results for various tests and FIG. 6B shows a graphical representation of the data in the table of FIG. 6A. The simulations illustrated in FIG. 6A-B included test conditions of 8 mbps internet traffic, a SISO antenna, and dynamic modulation-and-coding scheme (MCS) selection. As seen in FIG. 6A-B, the new technique for switching APs in a fast moving scenario has throughput significantly higher than the legacy technique.

Figure 7:
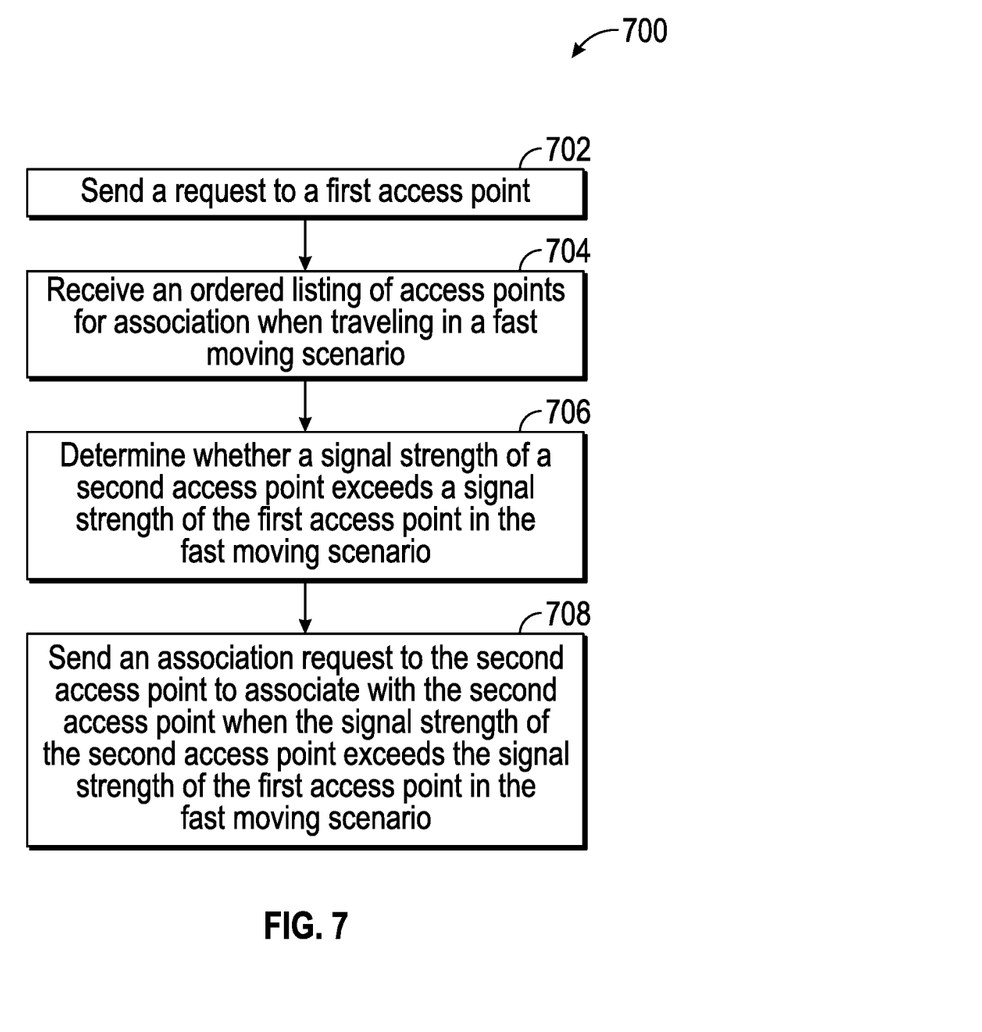
FIG. 7 illustrates the operation of a technique for switching APs in a fast moving environment in accordance with some embodiments.

FIG. 7 illustrates the operation of a technique 700 for switching APs in a fast moving environment in accordance with some embodiments. The technique 700 includes an operation 702 to send a request to a first access point, for example, using transceiver circuitry of an apparatus of a STA. The technique 700 includes an operation 704 to receive an ordered listing of access points for association when the STA is traveling in a fast moving scenario. Operation 704 may include receiving a SSID and a channel number with the ordered listing of access points. Operation 704 may include receiving a plurality of BSSIDs corresponding to the ordered listing of APs.

The technique 700 includes an operation 706 to determine whether a signal strength of a second access point exceeds a signal strength of the first access point in the fast moving scenario. For example, to determine whether the signal strength of the second AP exceeds the signal strength of the first AP may include to determine using processing circuitry of an apparatus of a STA. The STA may include memory, an antenna, and a display screen. The signal strength may be measured by received signal strength indicators (RSSIs). In another example Operation 706 may include determining whether the STA has reached a middle position, using GPS, between the first AP and the second AP.

The technique 700 includes an operation 708 to send an association request to the second access point to associate with the second access point when the signal strength of the second access point exceeds the signal strength of the first access point in the fast moving scenario. Operation 708 may include to send the association request by using the SSID, the channel number, and a BSSID of the plurality of BSSIDs, where the BSSID corresponds to the second AP, and the SSID and the channel number may be used for all of the APs.

Figure 8:
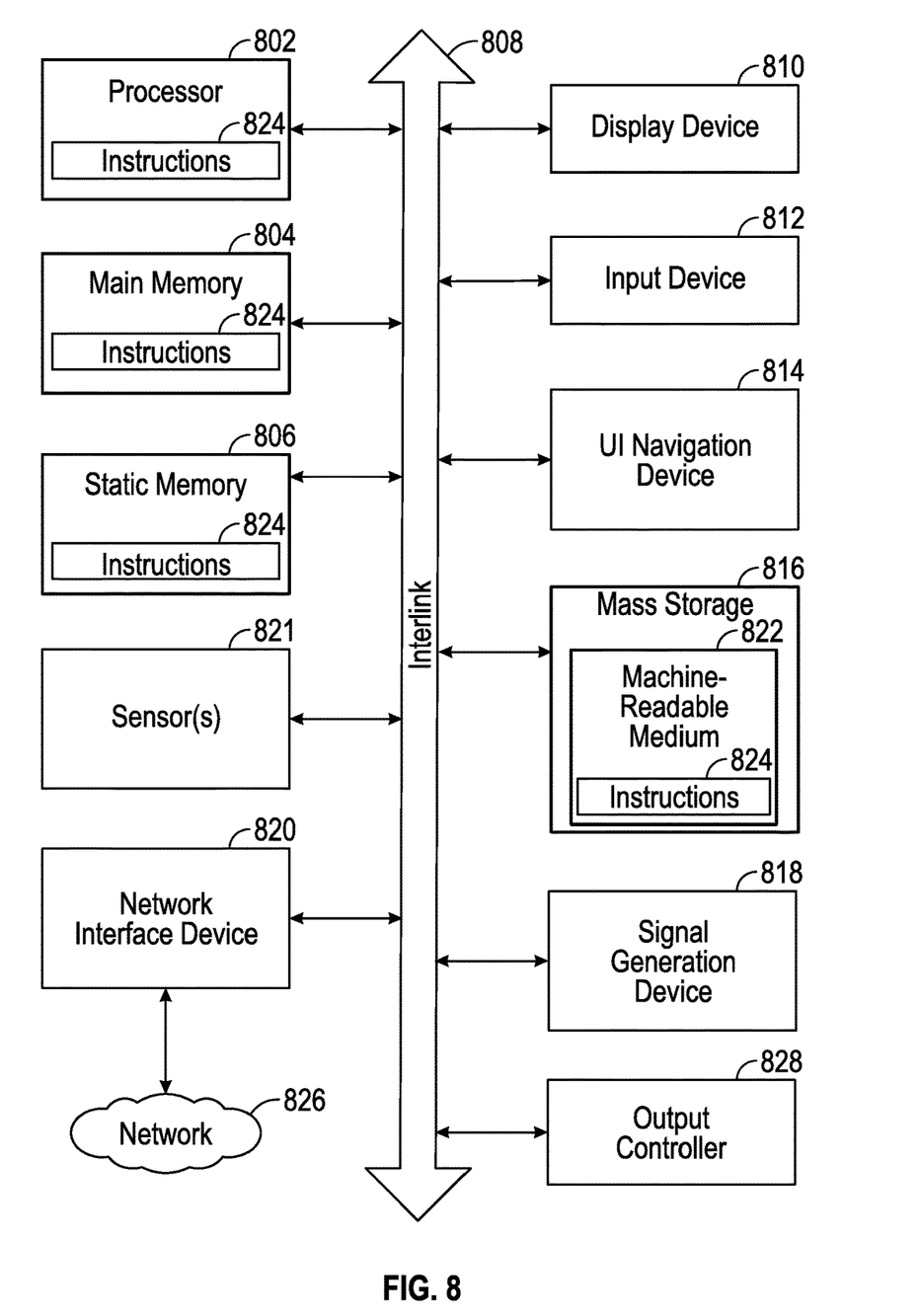
FIG. 8 illustrates generally an example of a block diagram of a machine upon which any one or more of the techniques (e.g., methodologies) discussed herein may perform in accordance with some embodiments.

In an example, the first AP is listed first and the second AP is listed second in the ordered listing of APs. In another example, the STA may associate with the second AP without first disconnecting from the first AP. The STA may associate with the second AP without sending a probe request or authentication request, receiving a probe response or authentication response, or without detecting the second AP. The first AP may be located at a bus terminal (or other public transportation terminal), and the ordered listing of APs may be physically arranged along a route of the bus (or other public transportation vehicle), starting at the bus terminal. The second AP, for example, may be just outside the bus terminal FIG. 8 illustrates generally an example of a block diagram of a machine 800 upon which any one or more of the techniques (e.g., methodologies) discussed herein may perform in accordance with some embodiments. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, alphanumeric input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 that is non-transitory on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is an apparatus of a communication station (STA), the apparatus comprising processing circuitry and memory configured to: configure a request for transmission to a first access point (AP) to associate with the first AP to access a network; decode a service set identifier (SSID), a channel number, an ordered listing of APs for association when traveling in a fast moving scenario, and a plurality of basic service set identifications (BSSIDs) corresponding to the ordered listing of APs; determine whether a signal strength of a second AP exceeds a signal strength of the first AP in the fast moving scenario; and in response to determining that the signal strength of the second AP exceeds the signal strength of the first AP in the fast moving scenario, configure an association request for transmission to the second AP to associate with the second AP to access the network using the SSID, the channel number, and a BSSID of the plurality of BSSIDs, the BSSID corresponding to the second AP.

In Example 2, the subject matter of Example 1 optionally includes, wherein the SSID applies to the APs in the ordered listing of APs.

In Example 3, the subject matter of any one or more of Examples 1-2 optionally include, wherein the first AP is a wireless AP operating in an Institute of Electrical and Electronics Engineers (IEEE) 802.11 network.

In Example 4, the subject matter of any one or more of Examples 1-3 optionally include, wherein the first AP is listed first and the second AP is listed second in the ordered listing of APs.

In Example 5, the subject matter of any one or more of Examples 1-4 optionally include, wherein to configure the association request for transmission to the second AP to associate, the processing circuitry is to configure the association request for transmission to the second AP to associate without first disconnecting from the first AP.

In Example 6, the subject matter of any one or more of Examples 1-5 optionally include, wherein to configure the association request for transmission to the second AP to associate, the processing circuitry is to configure the association request for transmission to the second AP to associate without first sending an authentication request.

In Example 7, the subject matter of Example 6 optionally includes, wherein to configure the association request for transmission to the second AP to associate, the processing circuitry is to configure the association request for transmission to the second AP to associate without first receiving an authentication response.

In Example 8, the subject matter of any one or more of Examples 1-7 optionally include, wherein to configure the association request for transmission to the second AP to associate, the processing circuitry is to configure the association request for transmission to the second AP to associate without detecting the second AP.

In Example 9, the subject matter of Example 8 optionally includes, wherein to configure the association request for transmission to the second AP to associate without detecting the second AP, the processing circuitry is to refrain from sending a probe request to the second AP.

In Example 10, the subject matter of Example 9 optionally includes, wherein to configure the association request for transmission to the second AP to associate without detecting the second AP, the processing circuitry is to refrain from decoding a probe response from the second AP.

In Example 11, the subject matter of any one or more of Examples 1-10 optionally include, wherein the ordered listing of APs correspond to a physical arrangement of the APs along a route of a bus starting at a bus terminal.

In Example 12, the subject matter of any one or more of Examples 1-11 optionally include, wherein the processing circuitry is to decode a first received signal strength indicator (RSSI) from the first AP and a second RSSI from the second AP; and wherein to determine that the signal strength of the second AP exceeds the signal strength of the first AP, the processing circuitry is to determine that the second RSSI exceeds the first RSSI.

In Example 13, the subject matter of any one or more of Examples 1-12 optionally include, further comprising a transceiver, the transceiver being configured by the processing circuitry for transmission and reception.

In Example 14, the subject matter of Example 13 optionally includes, further comprising one or more antennas coupled to the transceiver.

Example 15 is an apparatus of an access point (AP) comprising memory and processing circuitry to: determine a path including an ordered listing of APs for association when a communication station (STA) travels in a fast moving scenario; assign a service set identifier (SSID) and a channel number to APs in the ordered listing of APs; identify a plurality of basic service set identifications (BSSIDs) corresponding to the ordered listing of APs; receive a request from the STA to associate with the AP to access a network in the fast moving scenario; configure, for transmission, an association response to the STA indicating successful association; configure, for transmission, the ordered listing of APs, the SSID, the channel number, and the plurality of BSSIDs to the STA.

In Example 16, the subject matter of Example 15 optionally includes, wherein the SSID applies to all APs in the ordered listing of APs.

In Example 17, the subject matter of any one or more of Examples 15-16 optionally include, wherein the wireless AP is a wireless AP operating in an Institute of Electrical and Electronics Engineers (IEEE) 802.11 network.

In Example 18, the subject matter of any one or more of Examples 15-17 optionally include, wherein the wireless AP is listed first in the ordered listing of APs.

In Example 19, the subject matter of any one or more of Examples 15-18 optionally include, wherein the wireless AP is located at a bus terminal and the ordered listing of APs correspond to a physical arrangement of the APs along a route of a bus starting at a bus terminal.

In Example 20, the subject matter of any one or more of Examples 15-19 optionally include, wherein the transceiver is to: transmit a first received signal strength indicator (RSSI) to the STA; and when a second RSSI received by the STA from a second AP exceeds the first RSSI, receive an indication from the STA disconnecting the STA from the wireless AP.

In Example 21, the subject matter of any one or more of Examples 15-20 optionally include further comprising a transceiver, the transceiver being configured by the processing circuitry for transmission and reception.

In Example 22, the subject matter of Example 21 optionally includes, further comprising one or more antennas coupled to the transceiver and a display screen.

Example 23 is a method for configuring a station (STA) to connect to a plurality of access points (APs), the method comprising: sending a request to a first access point (AP) to associate with the first AP to access a network; receiving a service set identifier (SSID), a channel number, an ordered listing of APs for association when traveling in a fast moving scenario, and a plurality of basic service set identifications (BSSIDs) corresponding to the ordered listing of APs; determining whether a signal strength of a second AP exceeds a signal strength of the first AP in the fast moving scenario; and in response to determining that the signal strength of the second AP exceeds the signal strength of the first AP in the fast moving scenario, sending an association request to the second AP to associate with the second AP to access the network using the SSID, the channel number, and a BSSID of the plurality of BSSIDs, the BSSID corresponding to the second AP.

In Example 24, the subject matter of Example 23 optionally includes, wherein the SSID applies to the APs in the ordered listing of APs.

In Example 25, the subject matter of any one or more of Examples 23-24 optionally include, wherein the first AP is a wireless AP operating in an Institute of Electrical and Electronics Engineers (IEEE) 802.11 network.

In Example 26, the subject matter of any one or more of Examples 23-25 optionally include, wherein the first AP is listed first and the second AP is listed second in the ordered listing of APs.

In Example 27, the subject matter of any one or more of Examples 23-26 optionally include, wherein sending the request to the second AP to associate includes sending the request to the second AP to associate without first disconnecting from the first AP.

In Example 28, the subject matter of any one or more of Examples 23-27 optionally include, wherein sending the request to the second AP to associate includes sending the request to the second AP to associate without first sending an authentication request.

In Example 29, the subject matter of Example 28 optionally includes, wherein sending the request to the second AP to associate includes sending the request to the second AP to associate without first receiving an authentication response.

In Example 30, the subject matter of any one or more of Examples 23-29 optionally include, wherein sending the request to the second AP to associate includes sending the request to the second AP to associate without detecting the second AP.

In Example 31, the subject matter of Example 30 optionally includes, wherein sending the request to the second AP to associate without detecting the second AP includes not sending a probe request to the second AP.

In Example 32, the subject matter of Example 31 optionally includes, wherein sending the request to the second AP to associate without detecting the second AP includes not receiving a probe response from the second AP.

In Example 33, the subject matter of any one or more of Examples 23-32 optionally include, wherein the first AP is located at a bus terminal and the ordered listing of APs correspond to a physical arrangement of the APs along a route of a bus starting at a bus terminal.

In Example 34, the subject matter of any one or more of Examples 23-33 optionally include, further comprising receiving a first received signal strength indicator (RSSI) from the first AP and a second RSSI from the second AP; and wherein determining that the signal strength of the second AP exceeds the signal strength of the first AP includes determining that the second RSSI exceeds the first RSSI.

Example 35 is at least one machine-readable medium including instructions for operation of a computing system, which when executed by a machine, cause the machine to perform operations of any of the methods of Examples 23-34.

Example 36 is an apparatus comprising means for performing any of the methods of Examples 23-34.

Example 37 is at least one machine-readable medium including instructions for operation of a computing system, which when executed by a station (STA), cause the STA to: configure a request for transmission to a first access point (AP) to associate with the first AP to access a network; decode a service set identifier (SSID), a channel number, an ordered listing of APs for association when traveling in a fast moving scenario, and a plurality of basic service set identifications (BSSIDs) corresponding to the ordered listing of APs; determine whether a signal strength of a second AP exceeds a signal strength of the first AP in the fast moving scenario; and in response to determining that the signal strength of the second AP exceeds the signal strength of the first AP in the fast moving scenario, configure an association request for transmission to the second AP to associate with the second AP to access the network using the SSID, the channel number, and a BSSID of the plurality of BSSIDs, the BSSID corresponding to the second AP.

In Example 38, the subject matter of Example 37 optionally includes, wherein the SSID applies to all APs in the ordered listing of APs.

In Example 39, the subject matter of any one or more of Examples 37-38 optionally include, wherein the first AP is a wireless AP operating in an Institute of Electrical and Electronics Engineers (IEEE) 802.11 network.

In Example 40, the subject matter of any one or more of Examples 37-39 optionally include, wherein the first AP is listed first and the second AP is listed second in the ordered listing of APs.

In Example 41, the subject matter of any one or more of Examples 37-40 optionally include, wherein to send the request to the second AP to associate includes to send the request to the second AP to associate without first disconnecting from the first AP.

In Example 42, the subject matter of any one or more of Examples 37-41 optionally include, wherein to send the request to the second AP to associate includes to send the request to the second AP to associate without first sending an authentication request.

In Example 43, the subject matter of Example 42 optionally includes, wherein to send the request to the second AP to associate includes to send the request to the second AP to associate without first receiving an authentication response.

In Example 44, the subject matter of any one or more of Examples 37-43 optionally include, wherein to send the request to the second AP to associate includes to send the request to the second AP to associate without detecting the second AP.

In Example 45, the subject matter of Example 44 optionally includes, wherein to send the request to the second AP to associate without detecting the second AP includes to not send a probe request to the second AP.

In Example 46, the subject matter of Example 45 optionally includes, wherein to send the request to the second AP to associate without detecting the second AP includes to not receive a probe response from the second AP.

In Example 47, the subject matter of any one or more of Examples 37-46 optionally include, wherein the instructions further cause the STA to receive a first received signal strength indicator (RSSI) from the first AP and a second RSSI from the second AP; and wherein to determine that the signal strength of the second AP exceeds the signal strength of the first AP includes to determine that the second RSSI exceeds the first RSSI.

In Example 48, the subject matter of any one or more of Examples 13-14 optionally include, wherein the transceiver is to receive the SSID, the channel number, the ordered listing of APs, and the plurality of BSSIDs from the first AP.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. An apparatus of a station (STA), the apparatus comprising: memory; and, processing circuitry coupled to the memory, the processing circuitry configured to:
   encode a first association request for transmission to a first access point (AP) to associate with the first AP to access a network, the first association request comprising an indication of a fixed route for the STA;
   decode a first association response, the first association response comprising a service set identifier (SSID), an ordered listing of APs for association when traveling on the fixed route, a plurality of basic service set identifications (BSSIDs) corresponding to the ordered listing of APs, and a plurality of channel numbers corresponding to the ordered listing of APs;
   determine a position of the STA based on received positioning signals;
   determine whether to associate with a next AP of the ordered listing of APs based on the position of the STA with respect to the fixed route and a direction that the STA is moving with respect to the fixed route; and
   in response to determining, to associate with the next AP from the ordered listing of APs, refrain from transmitting a probe request to the next AP, and encode a next association request for transmission to the next AP, the next association request comprising the SSID and a corresponding BSSID of the plurality of BSSIDs.

2. The apparatus of claim 1, wherein the processing circuitry is configured to:
   use the SSID to associate with the APs in the ordered listing of APs.

3. The apparatus of claim 1, wherein the first AP, the next AP, and the STA are configured to operate in accordance with Institute of Electrical and Electronics Engineers (IEEE) 802.11.

4. The apparatus of claim 1, wherein the next AP is listed first in the ordered listing of APs.

5. The apparatus of claim 1, wherein the ordered listing of APs corresponds to a physical arrangement of APs of the ordered listing of APs along the fixed route.

6. The apparatus of claim 1, wherein the processing circuitry is further configured to:
   decode a first received signal strength indicator (RSSI) from the first AP and a next RSSI from the next AP; and
   determine to associate with the next AP based the position of the STA and on a signal strength of the next AP exceeding a signal strength of the first AP.

7. The apparatus of claim 1 further comprising a transceiver, the transceiver being configured by the processing circuitry for transmission and reception.

8. The apparatus of claim 7, further comprising one or more antennas coupled to the transceiver.

9. The apparatus of claim 1, wherein in response to determining to associate with the next AP from the ordered listing of APs further comprises:
refrain from disassociating with the first AP.

10. The apparatus of claim 1, wherein in response to determining to associate with the next AP from the ordered listing of APs further comprises:
configure the STA to transmit the next association request to the next AP on a corresponding channel number of the plurality of channel number.

11. The apparatus of claim 1, wherein the position signals are global positioning signals.

12. The apparatus of claim 1, wherein APs of the ordered listing of APs are associated with the network.

13. The apparatus of claim 12, wherein in response to determining to associate with the next AP from the ordered listing of APs further comprises:
refrain from transmitting an authentication request to the next AP.

14. The apparatus of claim 13, wherein the processing circuitry is further configured to:
before encode the first association request, encode an authentication request to the next AP, the authentication request requesting authentication of the STA to the network, and
decode a frame indicating the STA is admitted to the network; and
after encode the next association request, decode an association response, and encode a frame that access a service on the network.

15. An apparatus of a access point (AP), the apparatus comprising: memory; and, processing circuitry coupled to the memory, the processing circuitry configured to:
determine a path including an ordered listing of APs for association when a communication station (STA) travels in a fast moving scenario;
assign a service set identifier (SSID) and a channel number to APs in the ordered listing of APs;
identify a plurality of basic service set identifications (BSSIDs) corresponding to all APs of the ordered listing of APs;
receive a request from the STA to associate with the AP to access a network in the fast moving scenario;
configure, for transmission, an association response to the STA indicating successful association;
configure, for transmission, the ordered listing of APs, the SSID, the channel number, and the plurality of BSSIDs for all APs of the ordered listing of APs to the STA.

16. The apparatus of claim 15, wherein the SSID applies to all APs in the ordered listing of APs.

17. The apparatus of claim 15, wherein the wireless AP is a wireless AP operating in an Institute of Electrical and Electronics Engineers (IEEE) 802.11 network.

18. The apparatus of claim 15, wherein the wireless AP is listed first in the ordered listing of APs.

19. The apparatus of claim 15, wherein the wireless AP is located at a bus terminal and the ordered listing of APs correspond to a physical arrangement of the APs along a route of a bus starting at a bus terminal.

20. At least one non-transitory machine-readable medium that stores instructions for execution by one or more processors of a station (STA), the instructions to configure the one or more processors to:
encode a first association request for transmission to a first access point (AP) to associate with the first AP to access a network, the first association request comprising an indication of a fixed route for the STA;
decode a first association response, the first association response comprising a service set identifier (SSID), an ordered listing of APs for association when traveling on the fixed route, a plurality of basic service set identifications (BSSIDs) corresponding to the ordered listing of APs, and a plurality of channel numbers corresponding to the ordered listing of APs;
determine a position of the STA based on received positioning signals;
determine whether to associate with a next AP of the ordered listing of APs based on the position of the STA with respect to the fixed route and a direction that the STA is moving with respect to the fixed route; and
in response to determining to associate with the next AP from the ordered listing of APs, refrain from transmitting a probe request to the next AP, and encode a next association request for transmission to the next AP, the next association request comprising the SSID and a corresponding BSSID of the plurality of BSSIDs.

21. The at least one machine-readable medium of claim 20, wherein the instructions further configure the one or more processors to:
SSID applies to all APs in the ordered listing of APs.

22. The at least one machine-readable medium of claim 20, wherein the next AP is listed first in the ordered listing of APs.

23. The apparatus of claim 20, wherein APs of the ordered listing of APs are associated with the network.

24. The apparatus of claim 23, wherein in response to determining to associate with the next AP from the ordered listing of APs further comprises:
refrain from transmitting an authentication request to the next AP.

25. The apparatus of claim 24, wherein the instruction configure the one or more processors to:
before encode the first association request, encode an authentication request to the next AP, the authentication request requesting authentication of the STA to the network, and
decode a frame indicating the STA is admitted to the network; and
after encode the next association request, decode an association response, and encode a frame that access a service on the network.

* * * * *